(12) United States Patent
Barbero et al.

(10) Patent No.: US 9,083,277 B2
(45) Date of Patent: Jul. 14, 2015

(54) CONTROL DEVICE FOR AN ELECTRIC MOTOR

(75) Inventors: Maurizio Barbero, Turin (IT); Davide Cerrato, Asti (IT); Antonio Cicirello, Collegno (IT)

(73) Assignee: GATE S.R.L., Turin (IT)

( * ) Notice: Subject to any disclaimer, the term of this patent is extended or adjusted under 35 U.S.C. 154(b) by 70 days.

(21) Appl. No.: 13/357,993

(22) Filed: Jan. 25, 2012

(65) Prior Publication Data
US 2012/0187880 A1 Jul. 26, 2012

(30) Foreign Application Priority Data

Jan. 25, 2011 (IT) .............................. TO2011A0055

(51) Int. Cl.
*H02P 7/28* (2006.01)
*H02P 29/02* (2006.01)
*H02P 7/285* (2006.01)
*H02P 1/18* (2006.01)
*H02P 7/06* (2006.01)
*G06F 1/26* (2006.01)

(52) U.S. Cl.
CPC .............. *H02P 29/028* (2013.01); *H02P 7/285* (2013.01)

(58) Field of Classification Search
USPC ................. 318/490, 434, 400.3, 400.33, 432; 388/811
See application file for complete search history.

(56) References Cited

U.S. PATENT DOCUMENTS

| | | | | | |
|---|---|---|---|---|---|
| 5,442,272 | A | * | 8/1995 | Schwartz | 318/778 |
| 6,213,061 | B1 | * | 4/2001 | Bartolazzi et al. | 123/41.12 |
| 7,154,240 | B2 | * | 12/2006 | Watanabe | 318/434 |
| 7,205,737 | B1 | * | 4/2007 | Bilodeau | 318/434 |
| 8,278,855 | B2 | * | 10/2012 | Kitanaka | 318/400.22 |
| 2006/0066276 | A1 | * | 3/2006 | Koch et al. | 318/434 |
| 2007/0229011 | A1 | * | 10/2007 | Knab et al. | 318/434 |
| 2007/0247091 | A1 | * | 10/2007 | Maiocchi | 318/254 |
| 2008/0030158 | A1 | * | 2/2008 | Shibuya et al. | 318/434 |
| 2010/0102768 | A1 | * | 4/2010 | Leong et al. | 318/490 |
| 2011/0214660 | A1 | * | 9/2011 | Gillespie et al. | 126/21 A |
| 2012/0229067 | A1 | * | 9/2012 | Barbero et al. | 318/490 |

\* cited by examiner

*Primary Examiner* — Paul Ip
*Assistant Examiner* — Said Bouziane
(74) *Attorney, Agent, or Firm* — Muncy, Geissler, Olds & Lowe, P.C.

(57) ABSTRACT

A control device for an electric motor of a cooling fan for the radiator of a motor vehicle has a control transistor connected to the motor, and an electronic control unit for controlling the speed of the motor. The control unit controls the transistor in such a manner as to limit the current flowing in the motor to a predetermined value when, by effect of the load conditions of the motor and the voltage applied to the motor, the current in the motor tends to exceed the predetermined value.

5 Claims, 4 Drawing Sheets under 35 U.S.C. §119(a) from Patent Application No. TO2011 A 000055 filed in Italy on Jan. 25, 2011.

CONTROL DEVICE FOR AN ELECTRIC MOTOR

CROSS REFERENCE TO RELATED APPLICATIONS

This non-provisional patent application claims priority under 35 U.S.C. §119(a) from Patent Application No. TO 2011 A 000055 filed in Italy on Jan. 25, 2011.

FIELD OF THE INVENTION

This invention relates to a control device for a direct-current electric motor of a cooling fan for a motor vehicle, and in particular to a control device for the electric motor of a fan associated with the radiator of an internal-combustion engine.

BACKGROUND OF THE INVENTION

An electric fan for cooling the radiator of a motor vehicle typically comprises a direct-current electric motor and an axial fan which are both supported by a cowling which has the dual functions of optimizing the air flow downstream of the radiator and securing the motor/fan unit to the radiator or to another support provided in the motor vehicle.

In more advanced systems, the direct-current motor may be a motor having brushes which is associated with an electronic control unit or an electronic commutation or brushless motor also with an electronic control unit.

When operating axial fans at maximum speed the volume flow rate decreases with increasing pressure of the air and the torque needed and therefore, the electrical power required, increases (for the same number of revolutions) as the pressure increases.

With a stationary car, there is the maximum value of fluid-dynamic resistance and therefore the minimum value of air capacity. If the velocity of the car increases, the capacity of available air increases because the resistance decreases owing to the effect of the pressure caused by the velocity of the car itself. This behavior is counter to the natural need for cooling of the car because normally the thermal flux to be discharged increases when the car is moving.

In the case of a commutator motor being supplied with constant voltage, the speed at which the fan rotates decreases as the pressure itself increases owing to the greater power required.

The behavior in the case of an electronic commutation motor may be similar to that of a commutator type motor, or the controller may maintain a constant velocity for the entire range of operating pressure.

If a system being examined has insufficient capacity at low pressures and a capacity greater than requirements at high pressures, a simple solution for achieving the effectiveness required even at low pressures is to increase the velocity of the fan under those conditions. In that manner, the capacity curve extends upwards. The electrical power required increases accordingly. The result of such an action involves sizing the electric motor and the electronic control unit for far greater power levels, which involves higher costs for the product.

Furthermore, it is not always possible to follow this path because a maximum limit of power absorbed is fixed for reasons of dimensions and energy balance of the electrical system and in order to limit the emissions of pollutants and the consumption of the car.

The present invention specifically relates to a control device comprising: at least one control transistor which is substantially connected in series to a corresponding winding of the motor between the terminals of a direct-current supply voltage source; and an electronic control unit which is provided to control the at least one transistor in accordance with predetermined manners in accordance with at least one external control signal so as to bring about the actuation of the motor by controlling the voltage applied thereto and consequently, the velocity of the fan.

Such a control device is schematically illustrated in FIG. 1 of the appended drawings. In that Figure, there is generally designated 1 a cooling electric fan for an internal-combustion engine comprising a direct-current electric motor M of the type with brushes and an associated bladed fan rotor F. The motor M is substantially connected in series to a control transistor Q, for example, a transistor of the MOSFET type, between the two terminals or poles of a source (for example, a battery) S, which is able to distribute a direct-current supply voltage $V_S$. The input or gate of the control transistor Q is connected to the output of an electronic control unit ECU which is provided to control the transistor in predetermined manners in accordance with at least one external control signal.

SUMMARY OF THE INVENTION

Hence there is a desire for an improved control device which particularly allows effective protection of the motor and the associated electronic power commutator.

Accordingly, in one aspect thereof, the present invention provides a control device for a direct-current electric motor of a cooling fan for the radiator of a motor vehicle, comprising: at least one control transistor, connected in series to a corresponding winding of the motor, between the terminals of a source of a dc supply voltage; and an electronic control unit provided for controlling the at least one transistor in predetermined manners as a function of at least one external control signal so as to cause the activation of the motor by controlling the voltage applied thereto and, consequently, the speed of the motor, wherein the control unit is provided for controlling the at least one transistor in such a manner as to limit the current flowing in the motor to a predetermined value when, by effect of the load conditions of the motor and the voltage applied to the motor, the current in the motor tends to exceed the predetermined value.

Preferably, the electronic control unit is provided for limiting the current flowing in the motor to a constant predetermined value, when the voltage applied to the motor exceeds a predetermined value.

Preferably, the electronic control unit is provided for limiting the current flowing in the motor to a value corresponding to the ratio between a predetermined maximum value of the power in the motor and the voltage applied to the motor, when, by effect of the load conditions of the motor and the voltage applied to the motor, the power in the motor tends to exceed the predetermined maximum value.

Preferably, the maximum value of the power in the motor is a predetermined function of the temperature of the transistor.

The device according to the invention may be used for controlling a direct-current motor with or without brushes.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
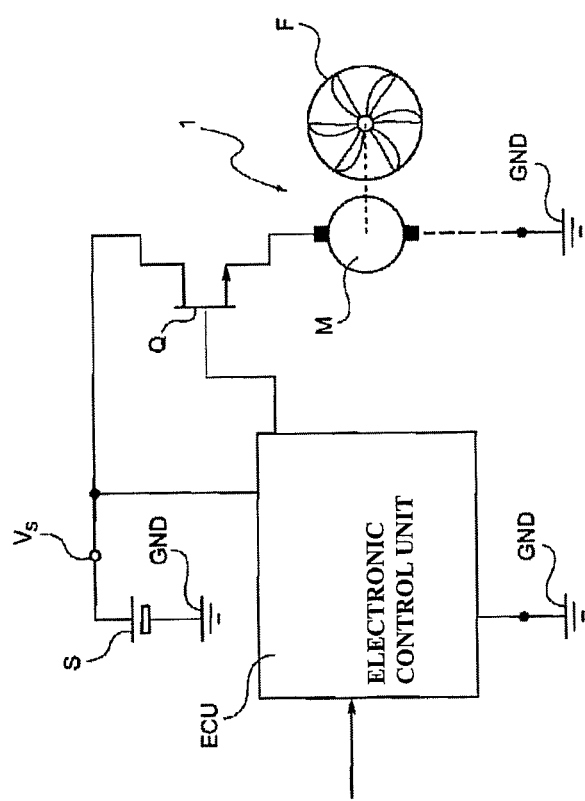
FIG. 1, already described, is an electrical circuit diagram, partially schematic, of a control device for an electric motor of a cooling fan.
Figure 2:
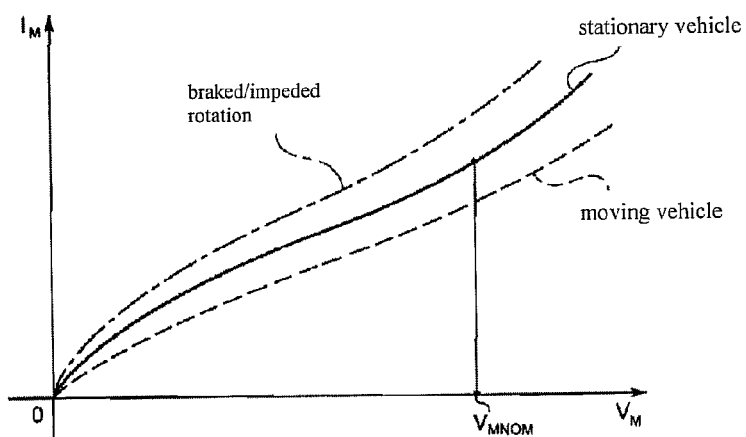
FIG. 2 is a graph which sets out on the abscissa the voltage $V_M$ in the motor and on the ordinate the current $I_M$ flowing in the motor, in accordance with characteristic operating lines which can be achieved with control devices according to the prior art.

A control device for an electric motor M of a cooling fan for an engine of a motor vehicle is provided to control the motor in accordance with characteristic lines of the type illustrated in FIG. 2. In FIG. 2, the solid line represents the operating characteristic of the motor M in a stationary motor vehicle. When the motor vehicle is in motion, the operating characteristic of the motor M varies and takes up a course of the type shown by the broken line owing to the effect of interference of the natural ventilation owing to the movement of the motor vehicle.

The characteristic illustrated with a chain line in FIG. 2 corresponds to an operating condition of the motor M in which the rotation of its shaft is braked or impeded.

In the graph of FIG. 2, the nominal voltage in the motor M is designated $V_{MNOM}$ and is generally less than the voltage $V_S$ distributed by the source (on-board battery) S.

Figure 3:
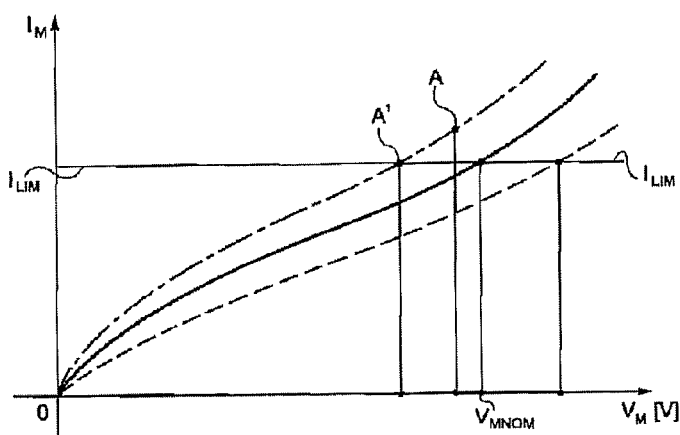
FIG. 3 is a graph similar to the graph set out in FIG. 2 and illustrates a control method which can be achieved with a device according to the present invention.

In the graph of FIG. 3, the same characteristic curves described above with reference to FIG. 2 are set out. With reference to FIG. 3, in a device according to the present invention, the electronic control unit ECU is provided to control the transistor Q so as to limit the current flowing in the motor M to a predetermined value $I_{LIM}$, when the conditions of load on the motor M and the voltage $V_M$ applied to the motor M tend to increase the current $I_M$ beyond that predetermined value.

In the control method to which the graph of FIG. 3 refers, the current $I_M$ in the motor M is limited to a maximum value $I_{LIM}$ which is constant, that is to say, independent of the instantaneous value of the voltage $V_M$ in the motor.

That control method makes provision for, in a stationary vehicle, the current $I_M$ to be limited to the value $I_{LIM}$ when the voltage $V_M$ in the motor is greater than $V_{MNOM}$. If, however, the motor M operates in a condition of overload (impeded rotation of the rotor) and its tendential working point would be represented, for example, by the point A of FIG. 3, the control unit ECU automatically provides for a reduction in the value of the voltage $V_M$ in the motor until the current $I_M$ becomes equal to the maximum value $L_{LIM}$, thereby imposing the working point designated A' in FIG. 3.

The operating method described above is independent of the control method of the transistor Q. The transistor Q may be controlled, for example, in a linear manner or in a pulsed manner, for example, by means of a square wave signal with a width or duration of modulated pulse.

Figure 4:
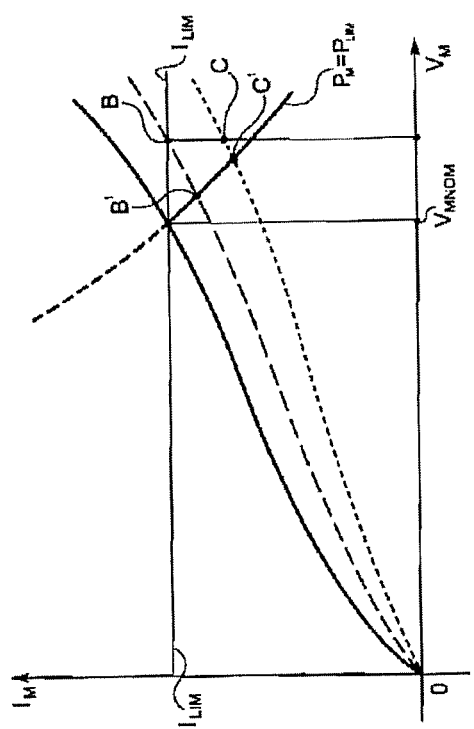
FIG. 4 is a graph similar to the graph set out in FIG. 3 and illustrates another control method which can be achieved with a device according to the invention.

FIG. 4 is a graph relating to another control method which is capable of allowing the implementation of another protection function. In this method, not only is the current $I_M$ flowing in the motor M limited but, furthermore, the power $P_M = V_M I_M$ is limited to a predetermined value designated $P_{LIM}$.

The graph of FIG. 4 sets out a curve $P_M$=constant=$P_{LIM}$. As is known, in the plane $I_M$, $V_M$, the curves $P_M$=constant are substantially equilateral hyperbolae.

Limiting the power $P_M$ to a limit value PLIM substantially means limiting the current $I_M$ in the motor M to a limit value $I_{PLIM} = P_{MLIM}/V_M$, in accordance with the variation of $V_M$.

With reference to the graph of FIG. 4, with a moving vehicle, the tendential working point of the motor M would be one of the points designated B and C, the control unit ECU provides for determining a reduction in the voltage $V_M$ in the motor M in such a manner that the power $P_M$ in the motor does not exceed the value $P_{LIM}$. In other words, the unit ECU intervenes in such a manner that the motor M is caused to operate at the working points B' and C', respectively, instead of at the points B and C.

The limit value $P_{LIM}$ advantageously may be, instead of being constant, variable in accordance with the temperature T of the control transistor Q in the sense that when that temperature increases the value of $P_{LIM}$ is reduced, and vice versa.

Figure 5:
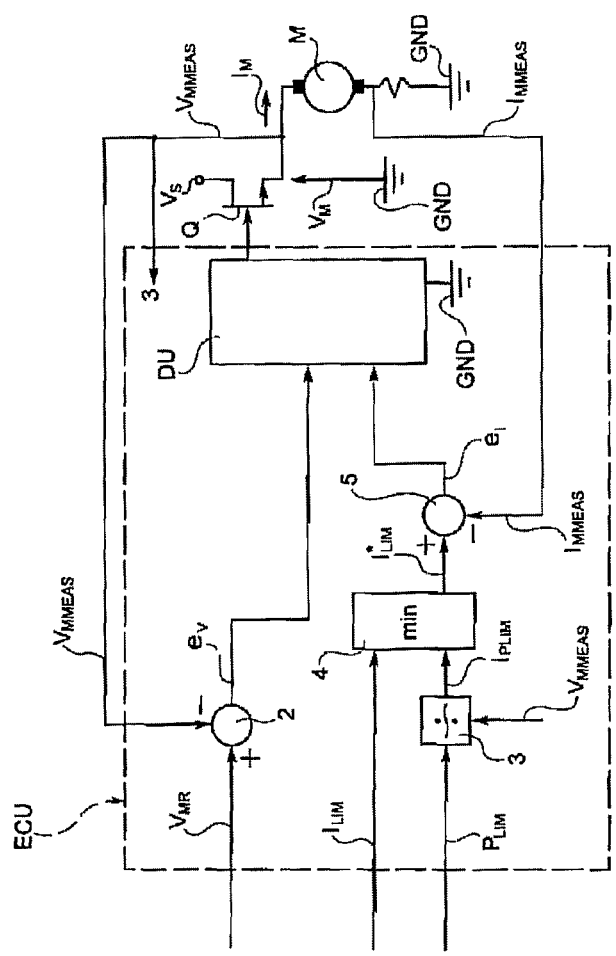
FIG. 5 is a schematic illustration of the operating methods of a control device according to the present invention.

FIG. 5 is a schematic illustration of the control achieved by the unit ECU operating in accordance with the graphs of FIG. 4. In FIG. 5, there is designated $V_{MR}$ a signal indicating the voltage required in the motor M, that is to say, the requirement for speed of rotation of the motor. Furthermore, the limit values defined above for the current $I_M$ and the power $P_M$ are designated $L_{LIM}$ and $P_{LIM}$.

With reference to the schematic illustration of FIG. 5, the voltage required in the motor $V_{MR}$ reaches a summing device 2 which subtracts there from the value $V_{MMEAS}$ established for the voltage $V_M$ in the motor M. Signals or data indicating the error $e_V$ in the voltage in the motor M are therefore available at the output of the summing device 2. That error $e_V$ is provided at the input of a control unit DU of the transistor Q.

In a parallel manner, a divider 3 divides the limit power $P_{LIM}$ by the measured value $V_{MMEAS}$ of the voltage $V_M$ in the motor and provides at the output a representation of the corresponding limit current $I_{PLIM}$. That limit current, as in the illustration of the limit current $I_{LIM}$, reaches the input of a selector device 4 for a minimum value. That device is provided in order to supply at the output a representation of a limit current $I^*_{LIM}$=min($I_{LIM}$, $I_{PLIM}$) to another summing device 5.

The summing device 5 further receives a representation of the measured value $I_{MMEAS}$ of the current $I_M$ in the motor M and supplies at the output a representation of the current error $e_I = I^*_{LIM} - I_{MMEAS}$ to the control unit DU. That control unit provides for activation of the control in accordance with the methods described above.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A control device for a direct-current electric motor, comprising:
   a transistor having a first current conducting electrode coupled to a first pole of a power source, a second current conducting electrode coupled to a second pole of the power source via a winding of the motor, and a control electrode; and
   an electronic control unit comprising:
   a divider having a first input for receiving a signal of a predetermined power limit value $P_{LIM}$, a second input coupled to the second current conducting electrode of the transistor, and an output providing a signal of a current limit value $I_{PLIM}$ by dividing the predetermined power limit value $P_{LIM}$ by a voltage $V_{MMEAS}$ at the second current conducting electrode of the transistor;
   a selector having a first input coupled to the output of the divider, a second input for receiving a signal of a predetermined current value $I_{LIM}$, and an output providing a signal of a lesser value $I^*_{LIM}$ of the current limit value $I_{PLIM}$ and the predetermined current value $I_{LIM}$;
   a summing device having a first input coupled to the motor for receiving a signal of a current value $I_{MMEAS}$ in the motor, a second input coupled to the output of the selector, and an output providing a signal of a current error $e_i = I^*_{LIM} - I_{MMEAS}$;
   a control device having an input coupled to the output of the summing device and an output coupled to the control electrode of the transistor for controlling the transistor in response to the signal of the current error $e_i$ so as to limit the current in the motor to the lesser value $I^*_{LIM}$ to limit the current in the motor to the predetermined current value when the current in the motor tends to exceed the predetermined current value, and limit the power consumption of the motor to the predetermined power limit value when the power consumption tends to exceed the predetermined power limit value by effect of increasing of the voltage applied to the motor; and
   wherein the current limit value $I_{PLIM}$ varies with the voltage $V_{MMEAS}$.

2. The control device of claim 1, Wherein the electronic control unit is provided for limiting the current flowing in the motor to constant predetermined value, when the voltage applied to the motor exceeds a predetermined value.

3. The control device of claim 1, wherein the predetermined power limit value in the motor is a function of the temperature of the transistor.

4. The control device of claim 1, wherein the direct-current electric motor is a direct-current electric motor with brushes.

5. The control device of claim 1, wherein the direct-current electric motor is a brushless electric motor.

* * * * *